3,498,869
METHOD FOR BONDING PAPERBOARDS
Yasufumi Murakami, Nishinomiya-shi, and Kenzo
 Nakajima, Amagasaki-shi, Japan, assignors to
 Nippon Gosei Kagaku Kogyo Kabushiki Kaisha,
 Osaka, Japan
No Drawing. Filed Aug. 15, 1966, Ser. No. 572,181
  Int. Cl. C09j *3/02, 3/18;* B44d *1/44*
U.S. Cl. 156—328          14 Claims

ABSTRACT OF THE DISCLOSURE

A method for binding sheets of paperboard together by coating one of the sheets with an aqueous suspension of polyvinyl alcohol at a temperature below about 45° C. so that the polyvinyl alcohol remains substantially undissolved and, after applying the second sheet to the coated sheet, baking the coating at a temperature above about 80° C. to solubilize the polyvinyl alcohol to form a secure bond between the sheets. Various modifiers may be added to the aqueous suspension.

---

The present invention relates to a method for bonding paperboards and an adhesive composition therefor, and particularly relates to an improved method for bonding paperboards by employing an aqueous suspension of finely divided solid polyvinyl alcohol as adhesive.

As is well known, some adhesives such as water glass and starch have been employed for bonding paperboards in the manufacture of corrugated boards or packaging cases. The use of water glass, however, is accompanied with some troubles such as staining and spotting of paperboards bonded therewith and poor moisture-resistance. The use of starch also has some disadvantages such as troublesome procedures in preparing the adhesive compositions, poor storage stability thereof and poor moisture-resistance.

The use of adhesives consisting of an aqueous solution of polyvinyl alcohol, a kind of water-sensitive synthetic resin, may be free from any trouble or disadvantage as described above, but it may cause other troubles such as peeling or separation of bonded paperboards because of a poor quick-setting ability of the adhesives. Particularly, in bonding paperboards with high-speed pasting machines in which quick-setting adhesives are especially required, the use of an aqueous solution of polyvinyl alcohol as adhesive is not suitable.

It is an object of the present invention to provide a novel method for bonding paperboards.

A particular object of the present invention is to provide a method for bonding paperboards without any of the troubles described above.

Another object of the present invention is to provide quick-setting adhesive compositions suitable for the use in bonding paperboards.

A further object of the present invention is to provide an adhesive composition suitable for use in preparing laminated or corrugated boards employing high-speed pasting machines.

Other objects of the present invention will be apparent from the following description and claims.

It has now been found that the above objects may be attained in accordance with the present invention by applying an aqueous suspension of finely divided solid polyvinyl alcohol on paperboards to be bonded at such a lower temperature that said polyvinyl alcohol will remain in a substantially unswollen solid state and then baking the bonded paperboards at such higher temperatures that said polyvinyl alcohol will quickly swell and dissolve in water. The lower, application temperature is preferably in the range up to about 45° C., desirably up to about 30° C., and the higher, baking, temperature is preferably in the range above about 80° C., desirably above about 100° C. The baking step is preferably carried out by passing the bonded paperboards through heating rolls for a short time. The polyvinyl alcohol employed in the present invention should be substantially insoluble in water at the lower temperature and readily soluble in water at the higher temperature. The term substantially insoluble means that at least 70% by weight of the polyvinyl alcohol present will remain as unswollen solid, and the term "readily soluble" means that at least 80% by weight of the present polyvinyl alcohol will quickly swell or dissolve in water. Such polyvinyl alcohol may be selected from the completely hydrolyzed grades, desirably from the group in which about 99% by mole or more is hydrolyzed because they have only little solubility in cold water. The less hydrolyzed grades of polyvinyl alcohol have greater solubility in cold water, in general. The latter may be, however, also employed in the present invention if their water-solubility is decreased by heating at an elevated temperature. The polyvinyl alcohol is employed in the form of finely divided solid suspended in an aqueous medium. Its particle size should be less than about $150\mu$, preferably about $20\mu$ to about $40\mu$, to secure quick dissolution of the polyvinyl alcohol in water upon baking. The preferable amount of the polyvinyl alcohol is about 2 to about 20%, desirably about 4 to about 13% by weight of the aqueous medium.

The aqueous suspension of the polyvinyl alcohol has low viscosity and is convenient to handle at the low temperatures at which it is applied to the surface of paperboards, while during the baking step the polyvinyl alcohol in the suspension will quickly swell and dissolve in the small amount of water present on the surface of paperboards to become highly viscous and, consequently, makes possible a powerful and quick bonding of paperboards.

Various modifiers may be added to the suspension. If it is required to control the amount of polyvinyl alcohol applied to the surface of paperboards by controlling viscosity of the suspension, either water-soluble resins or water-soluble salts may be added to the suspension to increase or decrease the viscosity of the suspension, respectively. Examples of such water-soluble resins are soluble-starch, dextrin, sodium carboxymethyl cellulose, methoxy cellulose, polyvinyl alcohol, their water-soluble derivatives and the like. The preferable amount of such water-soluble resin is about 0.1 to about 10% by weight of water. Examples of the water-soluble salt are sodium sulfate, ammonium sulfate, sodium chloride, ammonium chloride, potassium chloride, calcium chloride or sodium acetate. The preferable amount of such water-soluble salt is about 0.5 to about 5% by weight of water. Extenders may be added to the suspension. Examples of extenders are clay, kaolin, bentonite, silica, diatomaceous earth, calcium carbonate, alumina, starch and the like. Usually, the preferable amount of an extender is about 1 to about 3% by weight of water. If a gelling agent for polyvinyl alcohol in solution is added to the suspension, the suspension is made more viscous in the baking step and the loss of the adhesive caused by its over penetration is prevented, so that the adhesive strength may be further increased. Examples of the gelling agent are boric acid, borates and the like. The preferable amount of such gelling agent is about 0.05 to about 1% by weight of polyvinyl alcohol. For bonding waterproof paperboards treated with a waterproofing agent such as wax or asphalt, the addition of anionic, cationic or nonionic surface active agents is preferable to secure the bonding of paperboards. The preferable amount of the surface active agent is about 0.01 to about 0.5% by weight of water. Wet adhesive strength may be improved by adding amino-plasts to the suspension.

Examples of the amino-plasts are di-N-methylol urea, N-methylol melamine, N-methylol acetoguanamine, N-methylol benzoguanamine, methylated N-methylol melamine, a polymer containing N-methylol acrylamide unit, and the like. The preferable amount of such amino-plasts is about 3 to about 10% by weight of polyvinyl alcohol. If necessary, aqueous emulsions of synthetic resin, pH-adjusting agents such as sodium carbonate, etc. may be further added to the suspension.

ployed and 70 kg. of china clay and 20 kg. of starch powder were further employed.

Adhesion test was carried out as in Example 1. The adhesive strength of the corrugated board thus obtained was 21.2 kg./25 cm.$^2$.

Examples 3 to 10

Example 1 was repeated with the exception that a polyvinyl alcohol as described in the following Table 2 instead of the polyvinyl alcohol powder in Example 1 was employed.

The results are shown in Table 2.

TABLE 2

| | Specification of polyvinyl alcohol | | | | | | |
|---|---|---|---|---|---|---|---|
| Example Nos. | Viscosity (cps.) | Hydrolysis (percent) | Water-soluble parts at 30° C. (percent) | Water-soluble parts at 70° C. (percent) | Particle size ($\mu$) | Viscosity of suspension at 20° C. (cps.) | Adhesive strength (kg./25 cm.$^2$) |
| 3 | 27 | 0.1 | 1 | 80 | 40 | 400 | 21.2 |
| 4 | 27 | 0.6 | 3.5 | 100 | 40 | 1,200 | 20.8 |
| 5 | 27 | 1.2 | $^1$3 | 95 | 40 | 800 | 19.9 |
| 6 | 40 | 0.6 | 2 | 90 | 20 | 600 | 18.3 |
| 7 | 40 | 0.6 | 2 | 90 | 100 | 250 | 18.9 |
| 8 | 15 | 0.4 | 8 | 100 | 100 | 400 | 15.9 |
| 9 | 15 | 0.4 | 8 | 100 | 150 | 300 | 17.2 |
| 10 | 60 | 0.8 | 2 | 90 | 30 | 600 | 19.1 |
| Control: | | | | | | | |
| 1 | 27 | 2.0 | 26 | 100 | 40 | 4,000 | 9.2 |
| 2 | 40 | 0.6 | 2 | 85 | 180 | 150 | 8.8 |
| 3 | 40 | 0.01 | 0.5 | 55 | 40 | 600 | 9.5 |

$^1$ Baking was carried out at 150° C. for 30 min.

The method of the present invention may be broadly applied for bonding paperboards, particularly may be advantageously applied for preparing laminated or corrugated boards employing high-speed pasting machines.

The present invention is illustrated in detail by the following examples, but they are not to be considered as limiting the present invention. Parts and percentages specified are by weight unless otherwise indicated. Numbers listed as specifications of the polyvinyl alcohol mean viscosity of 4% aqueous solution at 20° C., hydrolysis, percentages of water-soluble parts thereof at 30° C., percentages of water-soluble parts thereof at 70° C. and particle size, respectively.

Example 1

A 1,000 liter vessel provided with an agitator was charged with 860 liters of water at about 25° C., 70 kg. of dry powder of polyvinyl alcohol and 70 kg. of china clay, and then the mixture was agitated to prepare an aqueous suspension of said polyvinyl alcohol and china clay to give an adhesive composition. The specifications of the polyvinyl alcohol are 27 centipoises, 99.0% by mole, 3%, 95% and 20$\mu$ as set forth immediately above.

A fluted medium board of 140 g./m.$^2$ in weight and a kraft-liner of 200 g./m.$^2$ in weight were bonded by using said suspension as an adhesive in a corrugating machine; the running speed of the board and the liner being 100 m./min., the contact time being about 0.002 sec., the temperature and pressure of the pressure roll being 170° C. and about 5 kg./cm.$^2$, respectively.

The control was prepared in the same way with the exception that said polyvinyl alcohol was completely dissolved in the mixture by heating.

The results are shown in the following Table 1.

TABLE I

| | Viscosity of suspension at 20° C. (cps.) | Adhesive strength (kg./25 cm.$^2$) |
|---|---|---|
| Example 1 | 400 | 18.9 |
| Control | 1,000 | 8.6 |

Example 2

Example 1 was repeated with the exception that 40 kg. of polyvinyl alcohol of which the specifications are 40 centipoises, 99.2% by mole, 1.5%, 85% and 40$\mu$ instead of the polyvinyl alcohol power in Example 1 were em- Examples 11 and 12

Example 1 was repeated with the exception that 20 kg. of soluble starch and 5 kg. of sodium carboxymethyl cellulose having a visosity of 510 centipoises in 1% aqueous solution at 25° C. and a degree of etherification of 0.7 were further employed, respectively.

The results are shown in the following Table 3.

TABLE 3

| Example Nos. | Viscosity of suspension at 20° C. (cps.) | Adhesive strength (kg./25 cm.$^2$) |
|---|---|---|
| 11 | 600 | 20.9 |
| 12 | 800 | 20.5 |

Example 13

A 2,000 liter vessel provided with an agitator was charged with 1,000 liters at water of about 20° C., 80 kg. of polyvinyl alcohol of which the specifications are 40 centipoises, 99.4% by mole, 1.5%, 90% and 50$\mu$, 100 kg. of kaolin clay, 5 kg. of sodium carboxymethyl cellulose having a viscosity of 420 centipoises in 1% aqueous solution at 25° C. and a degree of etherification of 0.8, and 0.2 kg. of borax, and then the mixture was agitated to prepare an aqueous suspension thereof.

A fluted medium board of 130 g./m.$^2$ in weight and a kraft-liner of 240 g./m.$^2$ in weight were bonded by using said suspension as an adhesive in a corrugating machine; the running speed of the board and the liner being 130 m./min., the contact time being about 0.002 sec., and temperature and pressure of the pressure roll being 130° C and about 5 kg./cm.$^2$ respectively.

The adhesive strength of corrugated board thus obtained was 21.3 kg./25cm.$^2$.

Examples 14 to 16

A suspension was prepared having the following proportions (Example 14):

Parts by Weight

Polyvinvyl alcohol of which the specifications are 27 centipoises, 99.6% by mole, 2%, 90% and 40$\mu$ _____ 70
China clay _____ 100
Soluble starch _____ 50
Sodium carbonate _____ 0.3
Borax _____ 0.15
Water _____ 1000

The surface of a single-faced corrugated board as in Example 1 was coated with the above suspension at the ratio of 50 g./m.²-board and then a kraft-liner of 220 g./m.² in weight was put on the coated board and pressed with a hot plate at 150° C.

Example 14 was repeated with the exception that 0.3 part of borax (Example 15) and 0.25 part of potassium tetraborate (Example 16) instead of 0.15 part of borax were employed.

The results are shown in the following Table 4.

TABLE 4

| Example Nos. | Viscosity of suspension (cps.) | | | Adhesive strength (kg./25 cm.²) | | |
|---|---|---|---|---|---|---|
| | At 20° C. | At 40° C. | At 50° C. | Baking: 3 sec. | Baking: 5 sec. | Baking: 10 sec. |
| 14 | 450 | 620 | 810 | 13.7 | 19.7 | 20.8 |
| 15 | 490 | 600 | 820 | 15.6 | 20.5 | 21.7 |
| 16 | 460 | 590 | 770 | 14.1 | 19.8 | 21.0 |

Examples 17 to 19

Example 14 was repeated with the exception that 5 parts of ammonium sulfate (Example 17), 5 parts of sodium chloride (Example 18) and 12.5 parts of sodium acetate (Example 19) were further employed.

The results are shown in the following Table 5.

TABLE 5

| Example Nos. | Viscosity of suspension (cps.) | | | Adhesive strength (kg./25 cm.²) | | |
|---|---|---|---|---|---|---|
| | At 20° C. | At 40° C. | At 50° C. | Baking: 3 sec. | Baking: 5 sec. | Baking: 10 sec. |
| 17 | 480 | 485 | 500 | 15.1 | 17.7 | 21.8 |
| 18 | 490 | 505 | 530 | 13.8 | 18.0 | 21.6 |
| 19 | 455 | 490 | 540 | 14.2 | 16.9 | 19.5 |

Example 20

A suspension was prepared having the following proportions:

Parts
Polyvinyl alcohol of which the specifications are centipoises, 88.8% by mole, 3.5%, 90% and 70μ _____ 80
Kaolin clay _____ 120
Sodium carboxymethyl cellulose, (viscosity of 1% aqueous solution at 25° C.: 650 centipoises, and degree of etherification: 0.7) _____ 6
Anhydrous sodium sulfate _____ 10
Water _____ 1000

A fluted medium board of 130 g./m.² in weight and a kraft-liner of 240 g./m.² in weight were bonded by using said suspension as and adhesive in a corrugating machine; the running speed of the board and the liner being 100 m./min., the contact time being about 0.002 sec., and temperature and pressure of the pressure roll being 130° C. and about 5 kg./cm.², respectively.

The coat weight as solid was 10.1 g./m.²-board and the adhesive strength of corrugated board thus obtained was 20.7 kg./25 cm.².

Example 21

Example 20 was repeated with the exception that 12 parts of 64% aqueous solution of N-methylol acetoguanamine was further employed.

A fluted medium board of 130 g./m.² in weight, treated with paraffin wax, and a graft-liner of 240 g./m.² in weight, treated with paraffin wax, were bonded by using the suspension of Example 20 as adhesive in a corrugating machine; the running speed of the board and the liner being 80 m./min., the contact time being about 0.003 sec., and temperature and pressure of the pressure roll being 160° C. and about 5 kg./cm.², respectively.

The coat weight as solid was 15.2 g./m.²-board and the wet adhesive strength of the thus obtained corrugated board after dipping into water at 20° C. for 24 hours was 3.37 kg./25 cm.².

Example 22

Example 21 was repeated with the exception that 3 parts of N-methylol melamine powder instead of the N-methylol acetoguanamine solution in Example 21 was employed.

The wet adhesive strength of the thus obtained corrugated board wah 3.27 kg./25 cm.².

Example 23

Example 22 was repeated with the exception that 10 parts of methylated N-methylol melamine instead of the N-methylol melamine was employed.

The wet adhesive strength of the thus obtained corrugated board was 3.41 kg./25 cm.².

Example 24

A suspension was prepared having the following proportions:

Parts by weight
Polyvinyl alcohol of which the specifications are 15 centipoises, 99.9% by mole, 5%, 100% and 80μ _ 80
China clay _____ 100
Sodium carboxymethyl cellulose (viscosity of 1% aqueous solution at 25° C.: 650 centipoises, and degree of etherification: 0.7) _____ 6
Polyoxyethylene lauryl ether (nonion surface active agent) _____ 1
Water _____ 1000

A fluted medium board, of 130 g./m.² in weight, treated with paraffin wax and a graft-liner, of 240 g./m.² in weight also treated with paraffin wax were bonded by using the above suspension as adhesive in a corrugating machine; the running speed of the board and the liner being 80 m./min., the contact time being about 0.003 sec., and temperature and pressure of the pressure roll being 165° C. and about 5 kg./cm.², respectively.

The coat weight as solid was 12.6 g./m.²-board and the adhesive strength was 18.1 kg./25 cm.².

Examples 25 and 26

A suspension was prepared having the following proportions (Example 25):

Parts by weight
Polyvinyl alcohol of which specification is 40 centipoises, 99.0% by mole, 8%, 100% and 100μ ___ 50
China clay _____ 80
Powdery starch _____ 30
Borax _____ 0.2
Sodium dodecylnaphthalene sulfonate (anion surface active agent) _____ 3
Water _____ 1000

A fluted medium board, of 140 g./m.² in weight, treated with paraffin wax was coated with the suspension at the ratio of 50 g./m.² and then a graft-liner, of 240 g./m.² in weight, also treated with paraffin wax was put on the coated board. Subsequently, they were treated in a corrugating machine at 150° C. under the pressure of 5 kg./cm.² for 0.003 sec.

Example 25 was repeated with the exception that, 1 part of cetyl trimethyl ammonium chloride (cation surface active agent) instead of sodium dodecylnaphthalene sulfonate was employed (Example 26).

The results are shown in the following Table 6.

TABLE 6

| Example Number: | Viscosity of suspension at 20° C. (cps.) | Adhesive strength (kg./25 cm.²) |
|---|---|---|
| 25 | 580 | 17.9 |
| 26 | 610 | 18.4 |

It will be understood that it is intended to cover all changes and modifications of the examples of the invention presented herein for purposes of illustration which fall within the scope and spirit of the invention as claimed.

What we claim is:

1. A method for binding at least two sheets of paperboard which comprises coating one sheet with finely divided insoluble solid polyvinyl alcohol suspended in an aqueous medium, applying a second sheet to the coated sheet and then baking the combined sheets until said solid polyvinyl alcohol dissolves in the aqueous medium to form a highly viscous aqueous paste to obtain a firm bond between the sheets.

2. A method as claimed in claim 1 wherein the aqueous suspension of said solid polyvinyl alcohol is coated on the surface of the first sheet at a temperature below about 45° C. and the baking of the combined sheets is carried out at a temperature above about 80° C.

3. A method as claimed in claim 2 in which said solid polyvinyl alcohol is suspended in water and has a particle size of less than 150$\mu$.

4. A method as claimed in claim 1 wherein 2 to 20 parts by weight of said solid polyvinyl alcohol is suspended in 100 parts by weight of said aqueous medium.

5. A method as claimed in claim 1 wherein said aqueous medium contains in solutions from 0.1% to 10% by weight of a water-soluble resin.

6. A method as claimed in claim 5 in which said water-soluble resin is selected from the group consisting of soluble-starch, dextrin, sodium carboxymethyl cellulose, methoxy celluose, soluble polyvinyl alcohol and water-soluble derivatives thereof.

7. A method as claimed in claim 1 wherein said aqueous medium contains 0.5% to 5% by weight of a water-soluble salt selected from the group consisting of sodium sulfate, ammonium sulfate, sodium chloride, ammonium chloride, potassium chloride, calcium chlorire and sodium acetate.

8. A method as claimed in claim 1 wherein said aqueous medium contains 0.05% to 5% by weight of a gelling agent for polyvinyl alcohol based on the weight of said polyvinyl alcohol.

9. A method as claimed in claim 8 wherein said gelling agent is selected from the group consisting of boric acid and borates.

10. A method as claimed in claim 1 wherein said aqueous medium contains 0.01% to 0.5% by weight of a surface active agent.

11. A method as claimed in claim 1 wherein an extender of from 1% to 30% by weight of said aqueous medium is employed together with said polyvinyl alcohol.

12. A method as claimed in claim 11 in which said extender is selected from the group consisting of clay, kaolin, bentonite, silica, diatomaceous earth, calcium carbonate, alumina and starch.

13. A method as claimed in claim 1 wherein an aminoplast resin of from 3% to 10% by weight of said polyvinyl alcohol is employed together with said polyvinyl alcohol.

14. A method as claimed in claim 13 wherein said aminoplast resin is selected from the group consisting of di-N-methylol urea, N-methylol melamine, N-methylol acetoguanamine, N-methylol benzoguanamine, methylated N-methylol melamine and a polymer containing N-methylol acrylamide unit.

References Cited

UNITED STATES PATENTS

| 2,764,568 | 9/1956 | Hawkins | 260—17 |
| 2,892,731 | 6/1959 | Claxton | 106—208 |
| 3,311,581 | 3/1967 | Pink et al. | 260—29.4 |
| 3,324,065 | 6/1967 | Pierce | 260—29.6 |

OTHER REFERENCES

Skeist: "Handbook of Adhesives," Reinhold 1962, pp. 366–369, 373.

WILLIAM H. SHORT, Primary Examiner

E. NIELSEN, Assistant Examiner

U.S. Cl. X.R.

156—327; 161—250; 260—17, 17.4, 29.6